No. 742,174. Patented October 27, 1903.

UNITED STATES PATENT OFFICE.

CARL DANIEL EKMAN, OF NORTHFLEET, ENGLAND.

PROCESS OF MAKING ADHESIVES.

SPECIFICATION forming part of Letters Patent No. 742,174, dated October 27, 1903.

Application filed July 30, 1901. Serial No. 70,236. (No specimens.)

*To all whom it may concern:*

Be it known that I, CARL DANIEL EKMAN, chemist, a subject of the King of Sweden and Norway, of Northfleet Paper Mills, Northfleet, Kent, England, have invented certain new and useful Improvements in the Manufacture of Adhesive Material Suitable for Use as a Substitute for Gum-Arabic and other Gums Soluble in Water, of which the following is a specification.

This invention has reference to the manufacture of an adhesive material suitable for use as a substitute for gum-arabic and other gums soluble in water.

The invention consists, shortly, in treating starch or a material containing a relatively high percentage of starch with a relatively strong sulfuric acid, the reaction being carried out at a relatively low temperature, and then neutralizing with a suitable base, as hereinafter mentioned.

In order to obtain good results in carrying out the invention, it is necessary that the sulfuric acid used should be of suitable concentration, that the temperature of the mixture of acid and starch shall not be too high, and that, further, the starch and sulfuric acid shall be allowed to act upon each other for the proper period of time. The quality of the resulting product depends also, as will be readily understood, upon the quality and nature of the starch or starch-containing material employed.

As raw material all ordinary kinds of starch are applicable. Rice-starch and potato-starch are very suitable; but other kinds of starch, such as maize and wheat starch, can also be employed with advantage. Flour containing a high proportion of starch may be used; but this gives less valuable results, and I find that starch is best adapted for the purposes of the invention both from the point of view of easy working and quality of final product.

I have found that the ordinary sulfuric acid of commerce, containing about seventy-nine to eighty per cent. of sulfuric-acid hydrate, is most suitable for the purposes of the invention. With acid of this concentration the process can be well regulated, and when it is carefully carried out constant and satisfactory results may be obtained. This acid of seventy-nine to eighty per cent. has the advantage of being cheap. If, however, the final product ought not to contain arsenic, it will be necessary to use acid free from arsenic, and consequently dearer. Another commercial acid which can be used for the purpose of this invention contains about ninety-two per cent. sulfuric-acid hydrate. This acid works more quickly; but the results I have obtained with it are less satisfactory, and therefore I have found no advantage in employing such acid, which, moreover, is more expensive. If the ordinary sulfuric acid of seventy-nine to eighty per cent. be mixed with water, the process goes more slowly, and if a mixture of three parts of the acid and one part water be used a much longer time is required to obtain a product similar to that obtained by employing the acid of seventy-nine to eighty per cent.

The temperature is of special importance. It must be kept low and should, preferably, not be allowed to exceed about 35° centigrade. If it rises too high, the formation of sugar or similar products is found to take place and the process lasts a shorter time. Moreover, the color suffers when a high temperature is allowed to be attained. The particular materials employed, however, and other circumstances likewise have an influence upon the color, as will be well understood. Much depends also upon allowing the mixture of starch and sulfuric acid to stand for the proper time before the neutralization is effected, since the properties of the final product depend greatly upon this. If the mixture of starch and acid be not allowed to stand too long, the resulting adhesive material when spread as a coating upon paper will be hard and brittle. If the mixture be allowed to stand too long, the resulting product will be soft and more or less hygroscopic—a property which is objectionable, as a rule, for most practical purposes. For ordinary purposes it is best to commence the neutralization of the acid before or as soon as by frequent tests the formation of sugar is found to have taken place. This, however, also depends upon the purposes for which it is intended to employ the final product. Another difference worthy of remark between the product which results when the mixture is allowed to stand a longer or shorter time before neutralization is that when the mixture has only stood a short time before neutralizing the clear solution obtained after neutralizing and evaporating very soon becomes turbid and assumes the appearance of an opaque whity cream. The shorter the time the mixture is allowed to stand before neutralization the quicker does this change take place, and the longer the mixture is allowed to stand before neutralizing the slower does the solution assume the creamy appearance in question, until finally when a sufficient time is allowed to elapse before neutralizing the thick evaporated solution remains clear and transparent. Moreover, when the mixture is allowed to stand too short a time before neutralizing the yield is diminished as compared with that obtained when the mixture is allowed to stand the proper time. This is due to the fact that some of the particles of starch are not transformed into soluble form. As before mentioned, however, it is of importance not to wait too long before neutralizing, as otherwise there is a fear of the product being hygroscopic and unsuitable for the purposes in view. The proper duration of standing before neutralization will soon be ascertained by experience. When the mixture has stood the proper time, it is neutralized in the ordinary way with a suitable base, a small quantity of water being preferably first added to facilitate the incorporation of the carbonate of lime or other neutralizing agent. In many cases in practice it is desirable that the final product shall contain no more mineral matter than is absolutely necessary. For this reason it is usually best to employ carbonate of lime as the neutralizing agent, because then only very small quantities of mineral salts will remain in the finished product. Natural chalk may be employed with advantage; but chemically-prepared carbonate of lime may also be used. If sulfate of magnesia in the finished product is not objectionable, magnesia may be used as the base, preferably in the form of its carbonate. Other bases, as soda, potash, and baryta, may also be employed, if desired. Care should be taken that no trace of acid remains in the neutralized mass. The neutralized mass after extraction with water may be put through a filter-press or otherwise freed from solid matter and can be evaporated in a similar manner to organic solutions of a similar kind at a low temperature, and best *in vacuo*, in order to obtain a product of good color. If an especially good color is desired, it is best to treat the solution with animal charcoal. For this purpose the solution may, for example, be evaporated to an extent which will still allow of its being filtered. It may then be treated warm with animal charcoal and filtered. On further evaporation to the desired degree of concentration a clear bright liquid is obtained.

If the process be properly carried out and suitable starch be employed as the raw material, the gum substitute obtained will be of good color and adhesiveness, quite sufficient for ordinary purposes.

In carrying out my invention I may proproceed, for example, as follows: I take thirty liters commercial sulfuric acid containing seventy-nine to eighty per cent. sulfuric-acid hydrate and one hundred kilograms dry rice-starch. I mix both materials together in small quantities, or if they are mixed in larger quantities suitable cooling means should be employed. To facilitate the mixture, the acid may with advantage be refrigerated before mixing with the starch, and a mixer may be employed having a jacket through which a liquid of low temperature may be circulated. The temperature during mixing should preferably not be allowed to rise above about 35° centigrade and is preferably reduced to about 20° centigrade at the end of the mixing process and maintained at about this temperature while standing. The mixture thus made is allowed to stand for the proper time, which may vary from one to three days, more or less. Frequent tests should be taken, and if these show that the formation of sugar has set in a small quantity of water is stirred in, the mixture is neutralized with carbonate of lime, and after further addition of water it is put through the filter-press. If a suitable filter-press is used, it is best to wash the sediment in the press and either evaporate it separately or to use it for the dilution of the next mixing, and so on in a systematic way, as is customary in similar cases, as in this way a far more concentrated liquor may be obtained and the sediment can then be very well washed. By evaporating the product to a greater or less extent it can be brought to any desired degree of concentration or it may be evaporated down to the condition of dry gum.

The finished product obtained by this invention very much resembles ordinary gum-arabic of high quality in properties and can be used as a substitute therefor. By its freedom from silicates and other inorganic or mineral constituents which are common in the gums of nature, being absorbed from the soil by the gum-trees, the new product is superior to the natural article. It can also be used in place of other similar kinds of gum and possesses the advantage, as compared with these latter, that it is free from dirt and foreign substances, besides being of better color when properly prepared from suitable materials, as above explained.

When rice, wheat, or other materials containing a large amount of starch are used, the process is carried out in a similar manner; but the residue containing nitrogenous matters remains undissolved and causes some difficulty in separating the sediment from the liquor. The product obtained from such materials is inferior to that obtained from pure starch, particularly as regards color.

I am aware that is not broadly new to produce an adhesive material by treating starch with sulfuric acid, and I do not claim such treatment, broadly; but in the processes heretofore in use dilute acids or acidulated water were made to act upon starch and starchy material at high temperature or at increased pressure for the purpose of manufacturing dextrine, which is entirely different from my invention, where the material is treated with sulfuric acid of high degrees of concentration and at a low temperature and then neutralizing the product, resulting in an increase of yield and a far superior product as compared with the results obtained with the process practiced before my invention. It is also well known to treat starch with concentrated sulfuric acid at a low temperature; but the obtained product has not been treated with alkaline bases up to about neutralization because it was not desired to obtain an adhesive substance, but simply sulfuric acid of starch, and thus the present invention could not be made or it could not be discovered that an excellent adhesive material is obtained by a previous treatment with concentrated acid, since neutralization was not tried and the product of the present invention was not obtained.

What I claim, and desire to secure by Letters Patent, is—

1. The process for manufacturing a new adhesive, which consists in treating starch with less than its own weight of sulfuric acid containing fifty per cent. to eighty-five per cent. of monohydrate at the ordinary or at reduced temperature until the formation of sugar can be detected, and then neutralizing with an alkaline agent and extracting the product.

2. The process for manufacturing a new adhesive, which consists in treating starch with less than its own weight of sulfuric acid containing fifty per cent. to eighty-five per cent. of monohydrate at the ordinary or at reduced temperature until the formation of sugar can be detected, and then neutralizing with an alkaline agent and extracting and purifying the product.

3. The process of manufacturing an adhesive material from starchy substances, which consists in treating said substances with sulfuric acid of about eighty per cent. and at a temperature reaching to about 35° centigrade, then allowing to stand, until saccharification commences, then neutralizing and purifying the product, substantially as described.

4. The process of manufacturing an adhesive material from starchy substances, which consists in treating said substances with sulfuric acid of about eighty per cent. and at a temperature reaching to about 35° centigrade, then allowing to stand, until saccharification commences, then neutralizing and extracting the product, substantially as described.

In witness whereof I have hereunto signed my name in the presence of two subscribing witnesses.

CARL DANIEL EKMAN.

Witnesses:
C. DANIELSON,
ANTON STAHLBERG.